United States Patent
Lau et al.

(10) Patent No.: US 9,645,386 B2
(45) Date of Patent: May 9, 2017

(54) CALIBRATION AND CONTROL OF DISPLAYS INCORPORATING MEMS LIGHT MODULATORS

(71) Applicant: Dolby Laboratories Licensing Corporation, San Francisco, CA (US)

(72) Inventors: Terence Ka Wing Lau, Burnaby (CA); William Brent Wilson, Belcarra (CA); Robin Atkins, Campbell, CA (US); Henry Hang Kei Ip, Richmond (CA); Gregory John Ward, Berkeley, CA (US); Douglas Campbell, Vancouver (CA); Neil W. Messmer, Langley (CA)

(73) Assignee: Dolby Laboratories Licensing Corporation, San Francisco, CA (US)

(*) Notice: Subject to any disclaimer, the term of this patent is extended or adjusted under 35 U.S.C. 154(b) by 589 days.

(21) Appl. No.: 13/689,461

(22) Filed: Nov. 29, 2012

(65) Prior Publication Data
US 2013/0147777 A1  Jun. 13, 2013

Related U.S. Application Data

(60) Provisional application No. 61/569,224, filed on Dec. 10, 2011.

(51) Int. Cl.
*G02B 26/02* (2006.01)
*G02B 26/00* (2006.01)
(Continued)

(52) U.S. Cl.
CPC .......... *G02B 26/02* (2013.01); *G02B 26/00* (2013.01); *G09G 3/346* (2013.01); *G09G 3/3406* (2013.01);
(Continued)

(58) Field of Classification Search
CPC ........ G02B 26/00; G02B 26/02; G09G 3/025; G09G 2360/144; G09G 2320/0626;
(Continued)

(56) References Cited

U.S. PATENT DOCUMENTS 6,188,427 B1 * 2/2001 Anderson et al. ............ 347/255
6,646,636 B1 * 11/2003 Popovich ................. G02B 5/32
345/102
(Continued)

FOREIGN PATENT DOCUMENTS

JP   2007052105   3/2007
WO  2012/125802   9/2012

OTHER PUBLICATIONS

Travis, A. et al., "Imaging via Backlights" SID 2011 Digest, section 71.4, Microsoft Corp. USA, vol. 42, Issue 1 pp. 1052-1055, Jun. 2011.

*Primary Examiner* — Que T Le
*Assistant Examiner* — Jennifer Bennett

(57) ABSTRACT

MEMS shutters are applied in displays and imaging devices. In a display, sensors may detect light from a light source that is back-reflected by a MEMS shutter and/or ambient light that enters through the MEMS shutter. The sensors may be used to monitor performance of the light source and/or ambient lighting conditions. In an imaging device, MEMS shutters may be applied to selectively block light to prevent overexposed areas within an image.

42 Claims, 6 Drawing Sheets

(51) Int. Cl.
*H05B 37/02* (2006.01)
*H04N 5/225* (2006.01)
*H04N 5/238* (2006.01)
*G09G 3/34* (2006.01)
*G09G 5/10* (2006.01)

(52) U.S. Cl.
CPC ............ *H04N 5/2254* (2013.01); *H04N 5/238* (2013.01); *H05B 37/02* (2013.01); *G09G 5/10* (2013.01); *G09G 2310/0235* (2013.01); *G09G 2320/066* (2013.01); *G09G 2320/0626* (2013.01); *G09G 2320/0666* (2013.01); *G09G 2320/0693* (2013.01); *G09G 2360/144* (2013.01); *G09G 2360/145* (2013.01); *G09G 2380/08* (2013.01)

(58) Field of Classification Search
CPC .. G09G 3/3406; G09G 3/346; G09G 2380/08; G09G 2360/145; G09G 2320/0693; G09G 2310/0235; G09G 2320/0666; G09G 2320/066; G09G 5/10; H04N 5/238; H04N 5/2254; H05B 37/02
USPC ......... 250/208.1, 234, 229, 216, 214 R, 550, 250/201.9, 201.1, 221; 345/207, 694; 359/230, 290, 292, 298, 318; 315/159
See application file for complete search history.

(56) References Cited

U.S. PATENT DOCUMENTS

| | | | |
|---|---|---|---|
| 7,370,979 B2* | 5/2008 | Whitehead | H04N 9/3102 345/207 |
| 7,417,735 B2 | 8/2008 | Cummings | |
| 7,474,294 B2 | 1/2009 | Leo | |
| 7,486,383 B2 | 2/2009 | Sekigawa | |
| 7,551,341 B1 | 6/2009 | Ward | |
| 7,638,754 B2 | 12/2009 | Morimoto | |
| 2005/0135441 A1 | 6/2005 | Ng | |
| 2005/0231693 A1* | 10/2005 | Seki et al. | 353/99 |
| 2006/0227085 A1* | 10/2006 | Boldt, Jr. | G09G 3/32 345/83 |
| 2007/0247594 A1* | 10/2007 | Tanaka | 353/77 |
| 2008/0088769 A1 | 4/2008 | Kim | |
| 2008/0112164 A1 | 5/2008 | Teshirogi | |
| 2009/0224678 A1* | 9/2009 | Wang | G09G 3/3426 315/158 |
| 2009/0251056 A1 | 10/2009 | Cho | |
| 2009/0295708 A1* | 12/2009 | Yamashita | G01J 1/4204 345/102 |
| 2010/0067095 A1 | 3/2010 | Fulton | |
| 2010/0188443 A1* | 7/2010 | Lewis | G02B 26/02 345/691 |
| 2012/0182278 A1 | 7/2012 | Ballestad | |

* cited by examiner

CALIBRATION AND CONTROL OF DISPLAYS INCORPORATING MEMS LIGHT MODULATORS

CROSS REFERENCE TO RELATED APPLICATIONS

This Application claims the benefit of priority to related, Provisional U.S. Patent Application No. 61/569,224 filed on 10 Dec. 2011 entitled "Applications of MEMs Pixels in Displays and Imaging Devices" by Terence Lau, et al, hereby incorporated by reference in its entirety.

TECHNICAL FIELD

This invention relates to displays (imaging devices) such as televisions, computer displays, displays on portable devices such as cellular telephones, music players, portable computers, and tablets, specialized displays such as medical imaging displays, virtual reality displays, displays on advertising systems and gaming systems, displays on digital cameras, and the like and also to image capture devices (such as photographic cameras, video cameras, holographic cameras, and the like).

BACKGROUND

Imaging devices require some mechanism for modulating light. Image displays incorporate light modulators that vary the amount of light emitted onto a screen or to a viewer. An example of this is displays that incorporate LCD panels having pixels that can be adjusted to vary the amount of light that is transmitted by the LCD panel. By driving the pixels according to image data, a desired image can be displayed.

Image capture devices may incorporate shutters (which may be opened to expose a sensor) and adjustable diaphragms (which may stop more or less light in providing an aperture).

Microelectromechanical systems (MEMS) have been developed for modulating light. One example of MEMS light modulators is the MEMS shutter array. In comparison to LCD technology, MEMS shutters can be relatively efficient at passing light and fast in switching states. Examples of display panels which incorporate MEMS shutters are the PerfectLight™ Display panels available from Pixtronix, Inc. of Wilmington, Mass. and the Timed Multiplexed Optical Shutter (TMOS) panels available from Uni-pixel, Inc. of The Woodlands, Tex.

SUMMARY

The invention has a wide range of aspects. These aspects may be used individually and also in various combinations. One group of aspects relates to displays and methods for displaying images. MEMS shutters are applied in displays. In a display, sensors may detect light from a light source that is back-reflected by a MEMS shutter and/or ambient light that enters the display through the MEMS shutter. The sensors may be used to monitor performance of the light source and/or ambient lighting conditions. Output from the sensors may be used to control display of images in various ways.

Another group of aspects relates to imaging devices. MEMS shutters may be applied to selectively block light to prevent overexposed areas within an image. Embodiments which apply various methods for controlling the operation of such MEMS shutters are described below.

While the embodiments described herein apply MEMS shutter light modulators, other fast-acting light modulators having performance characteristics similar to MEMS shutters could also be applied in the methods and apparatus described below.

One aspect of the invention provides a display comprising a MEMS light modulator and a light source configured to illuminate the MEMS light modulator. A light sensor is configured to be illuminated by light from the light source reflected by closed pixels of the MEMS light modulator.

Another aspect of the invention provides a method for calibrating display comprising a MEMS light modulator and a light source. The method comprises closing at least one shutter of a MEMS light modulator; illuminating the at least one shutter with light from the light source; and detecting light reflected by the at least one shutter.

Another aspect of the invention provides an image capture method comprising: identifying at least one overexposed pixel in image sensor data; and, acquiring an exposure by controlling a shutter corresponding to the overexposed pixel to reduce exposure of the overexposed pixel. The control may comprise, during a first exposure period blocking light to pixels of an image sensor corresponding to the at least one overexposed pixel and, during a second exposure period, allowing light to reach pixels the image sensor corresponding to the at least one overexposed pixel. The first and second exposure period may occur in any order.

Another aspect of the invention provides an image capture method comprising in a first exposure period, controlling a MEMS light modulator to expose only a first subset of pixels of an image sensor; in a second exposure period, controlling the MEMS light modulator to expose the first subset of pixels of the image sensor and a second subset of pixels of the image sensor; and controlling the image sensor to accumulate light in the first and second exposure periods.

A further aspect of the invention provides a display comprising: a light source, a display screen configured to receive light from the light source, a MEMS light modulator in an optical path between the light source and the display screen; and a light sensor configured to receive ambient light via a pixel of the MEMS light modulator. Some embodiments according this aspect comprise a controller configured to obtain an indication of light sensed by the light sensor when the pixel permits ambient light to reach the light sensor. The light source may be configured to illuminate the MEMS light modulator and the controller may be configured to obtain an indication of light sensed by the sensor when the light source does not illuminate the pixel of the MEMS light modulator.

Yet another aspect of the invention provides a method in a display for detecting an ambient lighting condition, the display comprising a light source, a display screen, a MEMS light modulator in an optical path between the light source and the display screen, and a light sensor configured to receive ambient light via a pixel of the MEMS light modulator. The method comprises driving the pixel of the MEMS light modulator to permit ambient light to reach the light sensor, and obtaining an indication of light sensed by the light sensor.

Still a further aspect of the invention provides a display comprising a MEMS light modulator, a first color light source configured to illuminate the MEMS light modulator, a second color light source configured to illuminate the MEMS light modulator, and a controller configured to cause the MEMS light modulator to produce a color image. The controller is configured to produce the color image by: driving the MEMS light modulator to modulate light from the first color light source to image a first color channel portion of the color image for a number of first subframes and driving the MEMS light modulator to modulate light from the second color light source to image a second color channel portion of the color image for a number of second subframes, and is configured to determine the number of first subframes and the number of second subframes based on the relative color saturations of the first color channel portion and the second color channel portion. In some embodiments according to this aspect, the first subframes and the second subframes are mutually exclusive.

Another aspect of the invention provides a method for displaying a color image, the color image having a first color channel portion and a second color channel portion. The method comprises determining a number of first subframes and a number of second subframes based on the relative color saturations of the first color channel portion and the second color channel portion, driving a MEMS light modulator to image the first color channel portion for the number of first subframes; and driving the MEMS light modulator to image the second color channel portion for the number of second subframes. In some embodiments according to this aspect, the first subframes and the second subframes are mutually exclusive.

Further aspects of the invention and features of example embodiments are described below and/or illustrated in the accompanying drawings.

BRIEF DESCRIPTION OF THE DRAWINGS

The accompanying drawings show non-limiting example embodiments.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
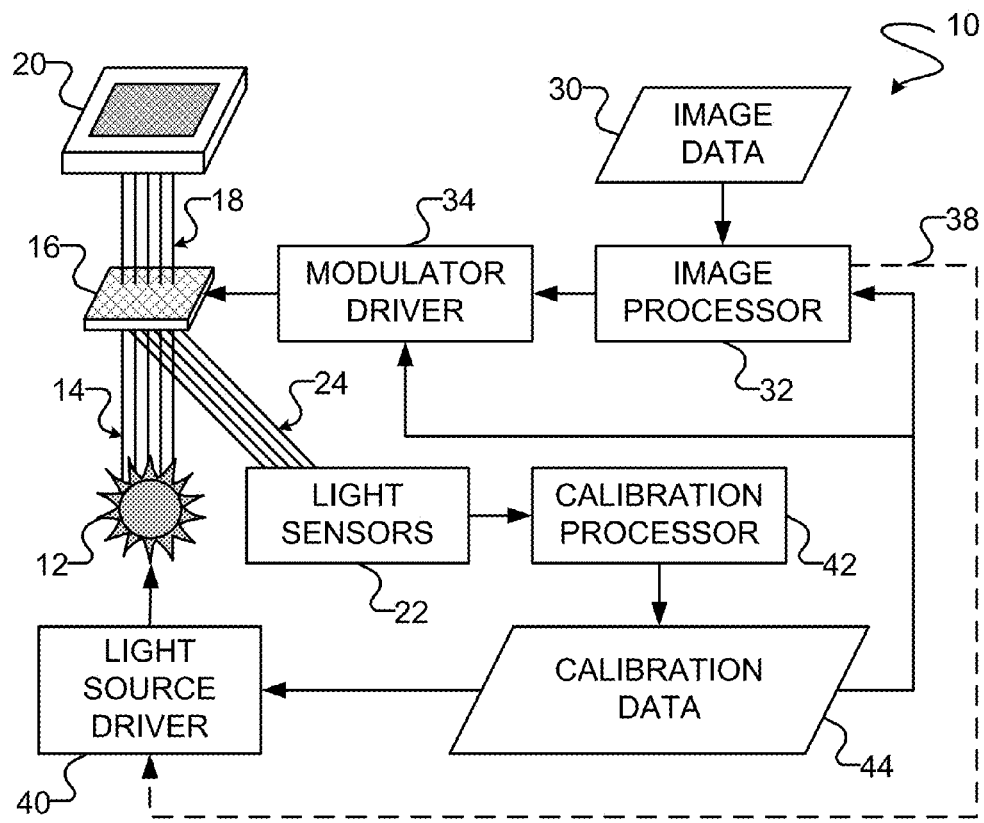
FIG. 1 is a schematic diagram of a display according to an example embodiment.

FIG. 1 shows a display 10 according to a first example embodiment of the invention. Display 10 comprises a light source 12 arranged to emit light 14 toward a MEMS shutter light modulator 16. Pixels of MEMS shutter light modulator 16 can be controlled to selectively pass light 18 to a screen 20 for displaying images or to block light from light source 12.

Light source 12 may comprise a single light source, a plurality of light sources that are controlled together, or a plurality of individually-controllable light sources. In some embodiments where light source 12 comprises individually-controllable light sources, the individually-controllable light sources are controlled according to image data. For example, elements of the light source 12 which illuminate portions of the modulator which include bright pixels may be controlled to emit more light than elements of the light source which illuminate only portions of the modulator corresponding to pixels for which the image data specifies lower luminance.

It can be desirable to measure the light emitted by light source 12 and/or by individual light emitting elements of light source 12 for various purposes. These include calibration of the light source elements, compensation for changes in light output due to aging of the light source elements and/or ambient conditions, monitoring of the distribution of light from light source 12 and the like.

MEMS shutter light modulator 16 shown in FIG. 1 comprises a plurality of independently controllable shutters. When closed, a shutter reflects incident light. Light sensors 22 are positioned to detect light 24 reflected by shutters of MEMS shutter light modulator 16. Closing shutters of modulator 16 also blocks ambient light from reaching light sensors 22. The light output from all or part of light source 12 may be measured by closing the MEMS shutters in all or a part of MEMS shutter light modulator 16, thereby causing light 14 to be reflected as reflected light 24 which can be detected by one or more light sensors 22.

Figure 1A:
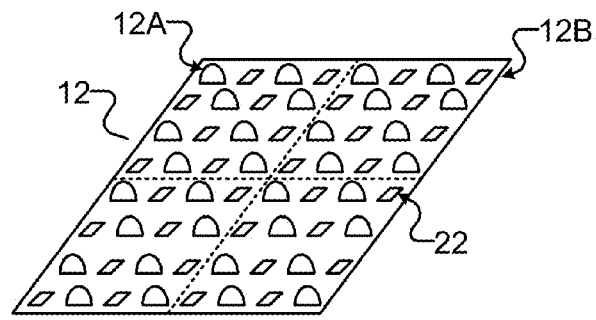
FIG. 1A is a schematic illustration showing a light source according to an example embodiment.

Light sensors 22 may be arranged in any of a wide variety of configurations. In some embodiments, an example of which is illustrated in FIG. 1A, light source 12 comprises an array of spaced apart light emitters 12A. Light sensors 22 are arranged generally in the same plane or surface as light emitters 12A at locations between light emitters 12A. In some embodiments, one or more light sensors 22 is provided in each of a plurality of areas 12B of light source 20.

In the illustrated embodiment, image data 30 is processed by an image processor 32. An image processor may manipulate the image signal in various ways for display. Image processor 32 generates a signal which controls a MEMS modulator driver 34 to control MEMS modulator 16 to display an image specified by image data 30. Optionally, image processor 32 generates a signal 38 which controls a light source driver 40. Signal 38 may control the global luminance of light source 12 (for example, signal 38 may comprise a signal which causes all elements of light source 12 to become brighter or dimmer).

Signal 38 is optionally more complicated. For example, signal 38 may cause different elements of the light source 12 to be controlled so as to alter the effective color temperature of light 14 and/or to separately control the luminance of light 14 emitted by individual areas 12B of light source 12. An area 12B may include one or more individual light emitters 12A. In some embodiments signal 38 controls the luminance of light 14 emitted by individual areas 12B of light source 12 according to image data for a corresponding area within an image to be displayed. In some embodiments signal 38 controls individual elements of light source 12 according to image data such that the light from light source 12 provides a low-resolution version of an image to be displayed.

Calibration processor 42 receives signals from light sensor(s) 22 indicative of light 24 received at light sensors 22 and generates calibration data 44. Calibration data 44 may be used by one or more of image processor 32, MEMS modulator driver 34, and light source driver 40 to control light 18 passed to screen 20 for more accurate rendering of displayed images. For example calibration data 44 may be used to compensate for differences between the actual output of light source 12 (or of individual light emitters 12A of light source 12) and the nominal output of light source 12 (or emitters 12A). In the illustrated embodiment, calibration data 44 is provided to all of image processor 32, MEMS modulator driver 34, and light source driver 40. This is not necessary; in some embodiments calibration data 44 is provided to only one or two of these elements.

In the illustrated embodiment, calibration data processor 42 is configured to acquire data from light sensors 22 during a calibration routine. By way of example, the calibration routine may involve closing shutters of MEMS modulator 16 so that light from light source 12 is reflected back to light sensors 22, operating one or more individual light emitters 12A of light source 12, and measuring the light received at light sensors 22 as a result of that operation. Such a calibration routine may be performed at various times in the operation of display 10. For example, such a calibration routine may be performed automatically when the display 10 is powered up, upon a user invoking a calibrate sequence by way of an user interface, during operation of the display in between frames of a video, or the like.

In some embodiments, a calibration routine is performed during display of images. For example, where display 10 is used to display video images, all of the shutters of the MEMS modulator 16 may be closed briefly between frames. The calibration routine for one or more individual light emitters 12A of light source 12 may be performed in this inter-frame interval. In some embodiments, calibration data processor 42 obtains data from light sensors 22 when image data 30 specifies that all of part of the area of MEMS modulator 16 should be dark (i.e. have its shutters closed). In such embodiments, when a dark area of MEMS modulator 16 is detected, calibration data processor 42 may cause one or more light emitters 12A of light source 12 to be briefly illuminated in the dark area and to monitor the amount of reflected light received at light sensors 22. In some embodiments the shutters of the MEMS modulator 16 are briefly closed while light emitters 12A of light source 12 are illuminated to display an image. This permits light sensors 22 to detect light intensities indicative of the pattern of light produced as a result of the operation of light-emitters 12A.

In some embodiments, light source 12 comprises separately controllable light emitters of a plurality of different colours. For example, light source 12 may comprise LEDs or other light emitting elements that emit light respectively of red, blue, and green primary colours. Optionally, light source 12 further includes additional primary colours such as yellow and/or cyan and/or magenta, and/or alternative red, green and blue primaries. In such embodiments, a separate calibration routine may be performed for light emitting elements of each colour. In the alternative, light sensors 22 may be equipped with color filters or made to be sensitive to a specific color in some other manner so that the amount of light emitted in the different primary colours may be separately monitored.

Light sensors 22 may additionally or in the alternative be used for monitoring ambient light conditions. Some displays comprise various systems for adjusting the display of images according to the ambient lighting conditions so that the images will have an appropriate appearance when viewed. A particular non-limiting example of where it may be advantageous to adjust image displays based on ambient light conditions is transflective displays. Transflective displays are displays capable both of reflecting and enabling the transmission of light. Transflective displays have application, for example, in mobile displays or displays that will be used outdoors or displays that will be used in environments that are, at least sometimes, brightly lit. Transflective displays may have light sources so that displayed images are visible in dark environments. One issue with such displays is to promote a smooth transition between reflective and transmissive modes (for example, at dusk for an outside display). The luminance of light sources in such displays may be controlled to achieve a smooth transition between reflective and transmissive modes.

In an example embodiment, ambient light is monitored by detecting light at light sensors 22 when MEMS shutters of MEMS modulator 16 are open (thereby allowing light from the ambient environment to reach light sensors 22). Calibration data 44 derived from output of light sensors 22 may be used by one or more of image processor 32, modulator driver 34 and light source driver 40 adjust light 18 to provide an image that is more appropriate for ambient light conditions.

Some displays monitor ambient light and control image display parameters such as contrast, brightness and/or color saturation based on the measurement of ambient light. The measurement may take into account the brightness and/or chromaticity of the ambient light. In an example embodiment, one or more light sensors 22 are used to monitor ambient light. Signals representing the outputs of the sensor(s) 22 are applied to a control circuit which adjusts the display parameters for the current ambient lighting conditions. In one example, sensors 22 are used as inputs to a method and/or apparatus as described in one or more of: U.S. patent application No. 61/433,454 filed 17 Jan. 2011 and entitled METHODS AND APPARATUS FOR ESTIMATING LIGHT ADAPTATION LEVELS OF PERSONS VIEWING DISPLAYS; and U.S. patent application No. 61/453,107 filed 15 Mar. 2011 and entitled METHODS AND APPARATUS FOR IMAGE DATA TRANSFORMATION; and U.S. patent application No. 61/539,438 filed 26 Sep. 2011 and entitled IMAGE FORMATS AND RELATED METHODS AND APPARATUSES all of which are hereby incorporated herein by reference for all purposes.

Shutters of MEMS modulator 16 may be opened and closed at high frequencies (e.g., some MEMS shutters can be opened and closed tens, hundreds or thousands of times per second) to modulate the light emitted for viewing by a user. In some embodiments, ambient light conditions are monitored by sampling the output of light sensors 22 according to the phase of shutters of MEMS modulators 16 (e.g., to obtain the output of light sensors 22 when corresponding shutters of MEMS modulator 16 are open).

In some embodiments, MEMS modulator driver 34 may be controlled to cause MEMS shutters of MEMS modulator 16 to open at a time while light source 12 is not emitting light, and the output of light sensors 22 sampled to obtain a measure of the ambient lighting unaffected by light 14 from light source 12. Where light emitters 12A of light source 12 are individually controlled, areas of MEMS modulator 16 not illuminated by light source 12 (e.g., not receiving light from light emitters 12A that are emitting light) may be opened and the output of light sensors 22 corresponding to these areas of MEMS modulator 16 sampled to obtain a measure of the ambient lighting unaffected by light 14 from light source 12.

In some embodiments, light sensors 22 include one or more light sensors that are located relative to MEMS modulator 16 such that the light sensors do not tend to receive any light originating from light source 12 when MEMS shutters of MEMS modulator 16 are open. For example, such light sensors may be recessed in recesses, pits or channels behind MEMS modulator 16, so that when the shutters of MEMS modulator 16 are open, there is no route by which a significant amount of light from light source 12 can reach the light sensors. Such light sensors may be applied to monitor ambient lighting conditions even when light source 12 emits light 14.

In some embodiments, the outputs of sensors 22 are monitored with MEMS shutters open and with MEMS shutters closed. These outputs may be compared to yield information regarding ambient lighting conditions and/or the light output by light source 12.

In some embodiments where the light emitters 12A of light source 12 are configured to emit light in narrow wavebands, one or more light sensors 22 located behind MEMS modulator 16 may comprise filters which block light from light source 12 (e.g., wide passband filters with stop bands matched to the emission wavebands of light emitters 12A). Such light sensors may be used to obtain a measure of ambient lighting without interference from light 14 of light source 12.

Figure 2:
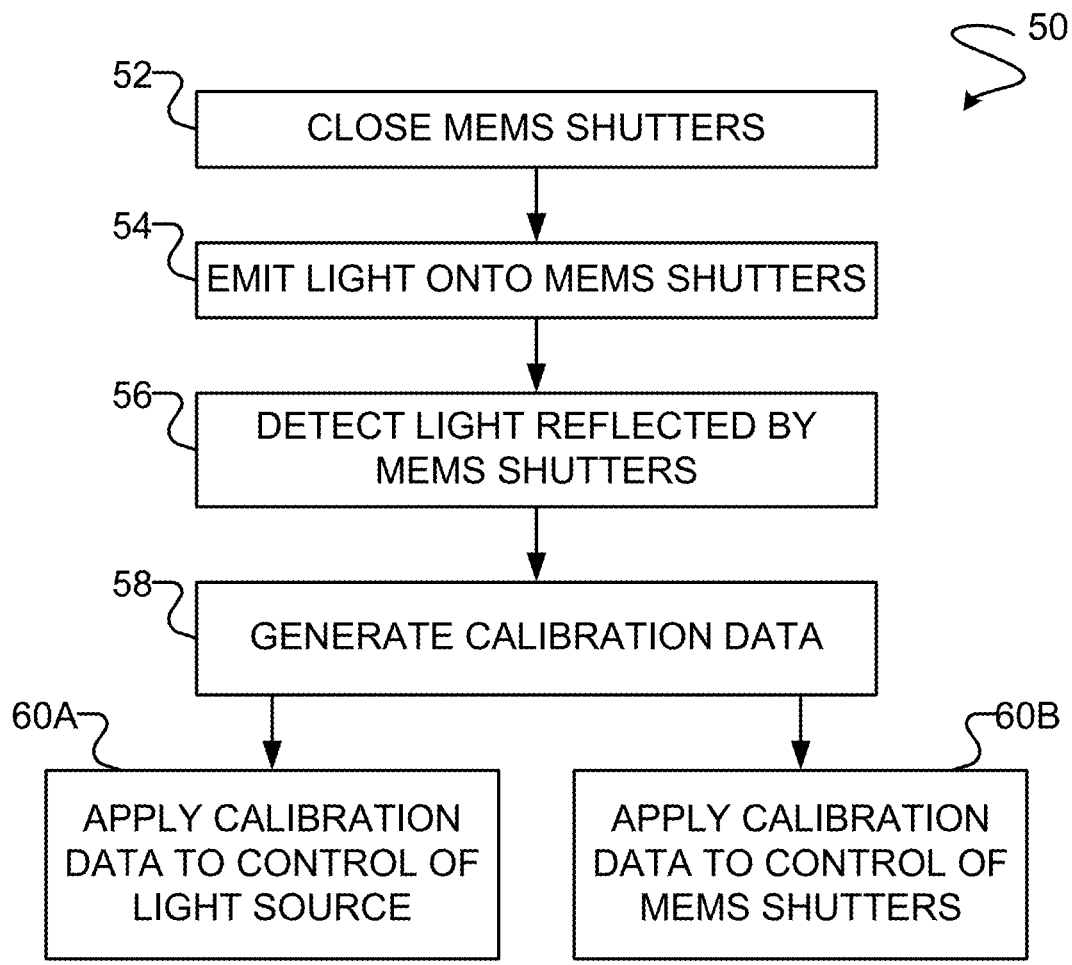
FIG. 2 is a flowchart of a method according to an example embodiment.

FIG. 2 is a flowchart of a method 50 according to an example embodiment. In block 52, MEMS shutters of a MEMS modulator are closed. In block 54, one or more elements of a light source is operated to emit light onto the MEMS shutters. In block 56 the light reflected from the MEMS shutters is detected at light sensors. In block 58 calibration data is generated based on the detected reflected light. Calibration data determined in block 58 may be suitable for use in controlling the MEMS shutters of the MEMS modulator and/or controlling the light source and/or processing image data for display.

In block 60A, calibration data is applied to control of MEMS shutters of the MEMS modulator. Block 60A may comprise adjusting a control signal generated by a MEMS modulator driver to compensate for variations in light output represented in the calibration data generated in block 58. For example, adjusting the control signal may comprise altering the duty cycle of a signal applied to drive the MEMS modulator (or its constituent light emitters).

In block 60B, calibration data is applied to control of the light source. Block 60B may comprise adjusting a control signal generated by a light source driver to compensate for variations in light output represented in the calibration data. For example, adjusting the control signal may comprise altering one or more of a current applied to drive the light source (or its constituent light emitters) and/or the duty cycle of a signal applied to drive the light source (or its constituent light emitters). Some embodiments perform only one of blocks 60A and 60B. Some embodiments perform both block 60A and 60B. Additionally or in the alternative, some embodiments perform image processing to alter image data so as to compensate for the variations in light output represented in the calibration data.

In an example embodiment, calibration data is generated based on factors which include a reflective index of the MEMS shutters when closed. Many MEMS shutters, when in a closed state, are highly reflective. Calibration data may also be based on a scale factors which relates the maximum light output when the MEMS shutters are opened to the maximum reflected light when the MEMS shutters are closed. Direct light leakage from light sources to the light sensors may also be taken into consideration in determination of calibration data.

Figure 3:
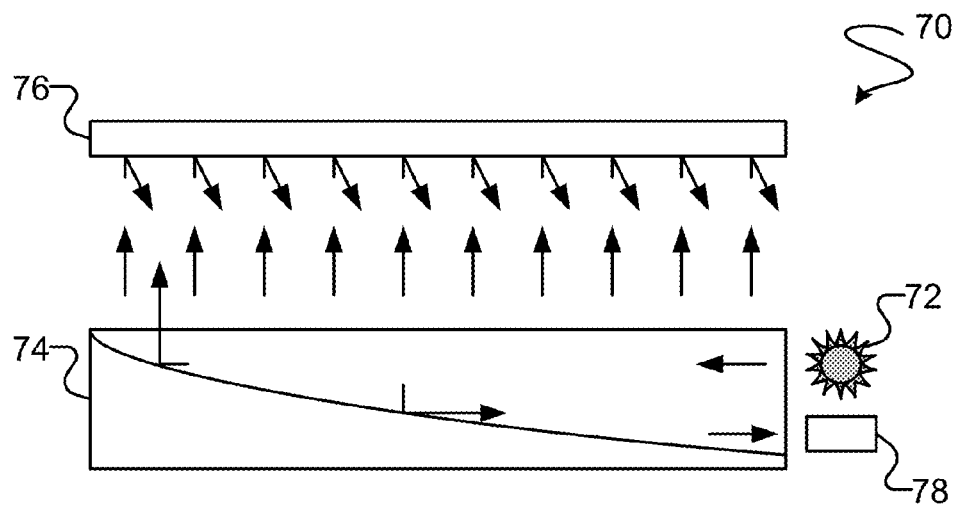
FIG. 3 is a schematic diagram of a display according to an example embodiment.

In some embodiments, a MEMS modulator is illuminated by light passing through a waveguide configured to receive light from a light source. Such embodiments may have the advantage of being very thin in the direction perpendicular to the plane of the MEMS modulator. In such embodiments, light reflected by the MEMS modulator when its shutters are closed may be reflected into the light guide and passed to one or more light sensors by way of the light guide. FIG. 3 shows a display 70 according to an example of such an embodiment. In display 70, a light source 72 (which may comprise multiple light emitters) emits light into a light guide 74. Light guide 74 emits light from light source 72 in the direction of a MEMS modulator 76. Light reflected from MEMS modulator 76 reenters light guide 74 and passes toward light sensors 78. Light sensors 78 may be located near light source 72 (for example, between light-emitting elements of light source 72).

Returning to FIG. 1, in some embodiments, display 10 comprises a sufficient number of light sensors 22 to detect variations in back-reflected light 24 over the area of MEMS modulator 16. In such embodiments, sensors 22 may effectively register a low resolution image cast by reflected light 24. For example, a display like that shown in FIG. 1 or 3 may incorporate sufficient sensors 22 to provide such low-resolution images. Such images can indicate spatial variations in the luminance of light 14 emitted by light source 12. In some such embodiments, calibration data 44 generated by calibration processor 42 may comprise spatially-specific calibration data. One or more of image processor 32, MEMS modulator driver 34, and light source driver 40 may use spatially-specific calibration data to make adjustments that affect the spatial variation of light 18 passed to screen 20. In some embodiments, such adjustments may cause light 18 passed to screen 20 to more faithfully reproduce an image specified by image data 30.

For example, where image data 30 specifies an image comprising an image area having uniform luminance, and the image registered by sensor 22 indicates that light reflecting from an area of MEMS modulator 16 that corresponds to the image area is not uniform, image processor 32 and/or modulator driver 34 may adjust the amount of light transmitted by a subset of the shutters in the area of MEMS modulator 16 to make the portion of light 18 corresponding to the image area more uniform (e.g., by controlling shutters that receive relatively less bright light 14 to transmit more light and/or by controlling shutters that receive relatively brighter light 14 to transmit less light). For another example, where image data 30 specifies an image comprising an image area having uniform luminance, and the image registered by sensor 22 indicates that light reflecting from an area of MEMS modulator 16 that corresponds to the image area is not uniform, image processor 32 and/or light source driver 40 may adjust the amount of light emitted by a subset made up of one or more of the light emitters 12A of light source 20 that illuminate the area of MEMS modulator 16 to make the portion of light 18 corresponding to the image area more uniform (e.g., by controlling light emitters 12A that illuminate relatively less bright portions of the area of MEMS modulator 16 to emit more light and/or by controlling light emitters 12A that illuminate relatively brighter portions of the area of MEMS modulator 16 to emit less light).

In some embodiments, output of light sensors 22 which indicates a pattern of spatially-varying light on MEMS modulator 16 is used to estimate a light field produced, at least in part, by light from light source 12, or to refine a simulation of a light field produced, at least in party, by light from light source 12. An estimated or simulated light field may be used in controlling light source 12, MEMS light modulator 16, or another light modulator in series with MEMS modulator 16, such as an LCD panel, for example. Displays as described herein may comprise such an additional modulator. Some examples of control of spatially-variable light sources and/or light modulators based on light field information are provided in U.S. Pat. No. 7,551,341 which is hereby incorporated herein by reference for all purposes.

Figure 4:
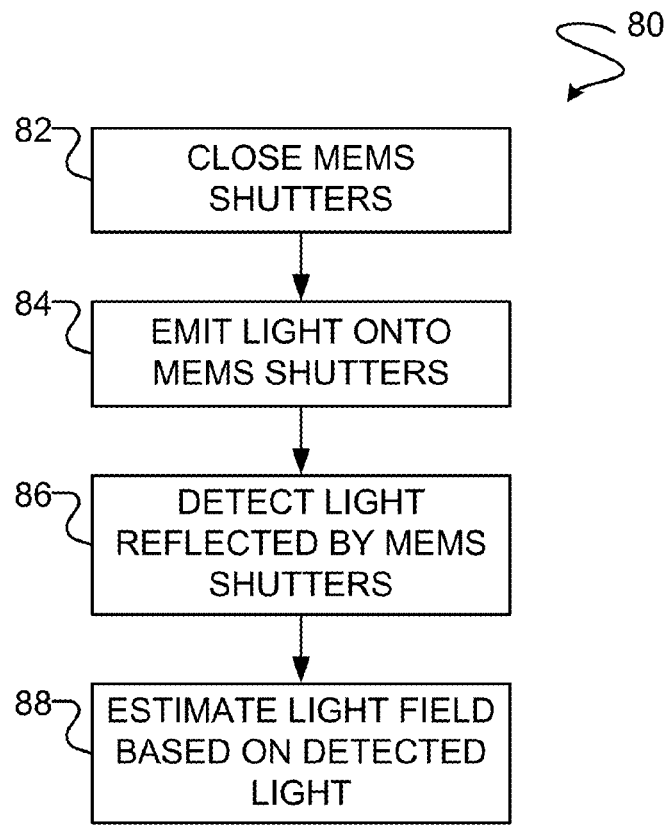
FIG. 4 is a flowchart of a method according to an example embodiment.

FIG. 4 is a flowchart of a method 80 for generating a light field estimate based on detected spatially-varying light at light sensors 22. In block 82, MEMS shutters of a MEMS modulator are closed. In block 84, one or more elements of a light source is operated to emit light onto the MEMS shutters. In block 86 the light reflected from the MEMS shutters is detected at light sensors. Block 86 may comprise generating one or more luminance values indicative of the luminance of light incident on sensors 22, for example. In block 88 a light field is estimated based on the detected light.

In some embodiments, block 88 comprises interpolating luminance values detected for a plurality of different sensors 22 arranged to receive light reflected by different portions of MEMS modulator 16. Such interpolation may be used to generate estimated luminance values at one or more points between adjacent points corresponding to light sensors. An interpolated value for a point may be based on luminance values for neighboring points that correspond to detected luminance values, as well as luminance values for non-neighboring points that corresponds to detected luminance values. In some embodiments, an interpolation algorithm or function determines interpolated luminance values based on two or more detected luminance values and one or more of: the distance between sensors 22 and MEMs light modulator 16, the distance between MEMs light modulator 16 and light source 12, the point spread function of light emitters 12A of light source 12 (and/or a characteristic thereof, such as full width at half maximum), the driving values applied to light emitters 12A of light source 12, and the like.

Figure 5:
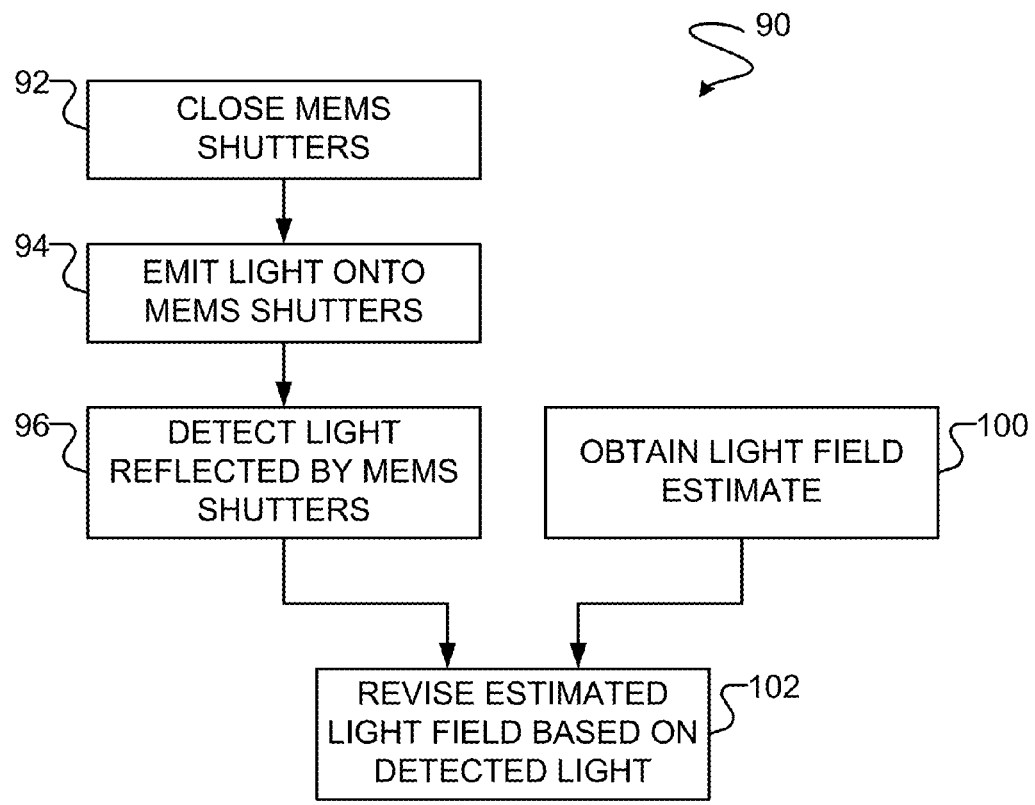
FIG. 5 is a flowchart of a method according to an example embodiment.

In some embodiments, a light field estimate generated without use of detected luminance values (e.g., by light field simulation, low pass filtering of the image to be displayed, etc.) is refined based on detected luminance values. FIG. 5 is a flowchart of a method 90 for refining a light field estimate based on detected spatially-varying light at light sensors 22. In block 92, MEMS shutters of a MEMS modulator are closed. In block 94, one or more elements of a light source is operated to emit light onto the MEMS shutters. In block 96 the light reflected from the MEMS shutters is detected at light sensors. Block 96 may comprise generating one or more luminance values indicative of the luminance of light incident on sensors 22, for example. In block 100 a light field estimate is obtained. In block 102, the light field estimate obtained in block 100 is refined based on light detected in block 96.

In some embodiments, block 102 comprises comparing (e.g. determining a difference between or computing a ratio of or the like) one or more detected luminance values and one or more luminance values of the light field estimate, and determining a revised light field estimate based on the comparison. For example, a revised light field estimate may be determined by scaling and/or shifting luminance values of the original light field estimate by a factor and/or offset based on the comparison. In some embodiments, a plurality of such comparisons are calculated (e.g., one for every luminance value in the light field estimate, one for every detected luminance value, etc.), and revised luminance values corresponding to different portions of MEMS light modulator 16 are determined based on different comparisons. For example, a revised estimated luminance value for a given point may be based on the comparison between the original estimated luminance value for the point and a distance-weighted average of the detected luminance values corresponding to points adjacent the point. In other embodiments, all revised luminance values are determined based on a single comparison (e.g., a difference between or ratio of the mean luminance value of the light field estimate and the mean detected luminance value).

Spatially-specific calibration data may also be used by one or more of image processor 32, MEMS modulator driver 34, and light source driver 40 to produce light 18 that exhibits other desired characteristics, such as peak luminance, color uniformity, and the like, for example.

In embodiments where the amount of light of each of a plurality of colors emitted by light source 12 can be separately controlled (e.g., as in the case where light source 12 comprises light emitting diodes or other light emitters corresponding to a plurality of distinct primary colors and light source 12 includes circuits for separately controlling light emitters of the different colors), the speed of switching afforded by a MEMS shutter display panel permits the application of some innovative time domain multiplexing (TDM) display methods. Time domain multiplexing techniques involve dividing a frame into a number of subframes. In some embodiments, light source 20 is controlled to emit light of only a single primary color in each subframe. The rapid switching between subframes is not detected by the eye. Instead, the eye perceives a full color image. Rapidly switching among red, green, and blue subframes (or subframes dedicated to other primary colors) can be useful in reducing color fringing effects.

One advantage of the speed with which MEMS shutter assemblies can be switched is that a single frame can be divided into a large number of subframes. For example, an 8.3 millisecond frame can be divided into 40 or more subframes. Making each subframe very short may tend to reduce the likelihood of visual artifacts resulting from the switching between the subframes. In some embodiments, the number of subframes allocated to each color (or the proportion of available subframes allocated to each color) is varied depending upon the degree of color saturation of the corresponding color in the image. For example, if an image frame is primarily red, then the number of subframes in which the red light emitters on the light source are emit light may be increased relative to the number of subframes in which blue and green light emitters emit light.

Figure 6:
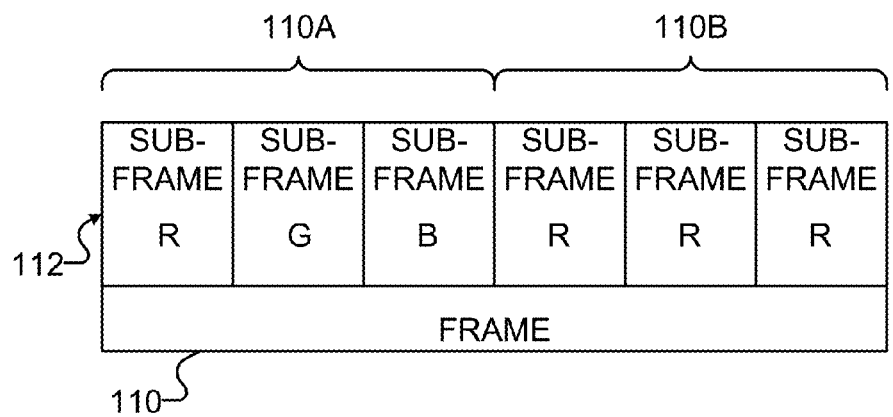
FIG. 6 is a schematic diagram of a frame divided into sub-frames according to an example embodiment.

FIG. 6 illustrates a frame 110 divided into subframes according to an example embodiment. In this embodiment frame 110 is divided into a plurality of subframes 112. A number of subframes 112 are dedicated to specific primary colors. In the illustrated embodiment, a first portion 110A of frame 110 has subframes 112 dedicated to red, green, and blue primary colors. Each subframe 112 in portion 110A shows a respective color-channel portion (R, G, B) of the image to be displayed in frame 110. In the illustrated embodiment, first portion 110A includes multiple subframes 112 for each primary color.

Another number of subframes 112 are not dedicated to any specific primary color. In the illustrated embodiment, a second portion 110B of frame 110 has a plurality of non-dedicated subframes. Non-dedicated subframes may be used to show additional color-channel portions of the image to be displayed in frame 110. The color shown in a non-dedicated subframe may change from one frame to the next.

In some embodiments, one or more non-dedicated subframes may display a color-channel portion corresponding to the dominant color of the image to be displayed in the frame. For example, if red is a dominant color for the frame image then one or more non-dedicated subframes may be assigned as red subframes or primarily as red subframes. This is shown in FIG. 6. This allows more highly saturated reds to be depicted in the frame.

It is not mandatory that non-dedicated subframes be in any particular position within the frame. In some embodiments, non-dedicated subframes are spaced apart throughout the frame. It is not mandatory that the same time division multiplexing scheme be applied to all shutters of a MEMS light modulator. In cases where a light source has different light emitters configured to illuminate different portions of a light modulator, different time domain multiplexing schemes may be applied in different local regions of the light modulator corresponding to different light emitters. It is not mandatory that the light emitting elements of the light source emit light at the same luminance throughout a frame. In some embodiments, a light emitter of the light source emits light at different brightness levels in different subframes.

Different types of light sources may be used with displays as described above. In addition to the light sources described above, one could provide displays as described herein with a light source comprising blue light emitters (for example, light emitting diodes that emit light in the blue or ultraviolet range). Quantum dots may be provided to shift the wavelength of the blue or ultraviolet light into various visible wavelengths. Different groups of quantum dots that generate light of different visible colors may be aligned with different pixels of a MEMS light modulator. With this construction, each pixel of the MEMS light modulator corresponds to a different color.

Technology as described herein may be applied to projection-type displays as well as to direct-viewing displays. For example, a MEMS light modulator may be deployed between a projector and a screen on which images are projected. The MEMS panel may be controlled to provide better black levels. The MEMS panel may be located far enough away from the projection lens so as to be somewhat out of focus. In alternative embodiments a MEMS light modulator is provided closer to the light source, for example, at a location between the light source and a projection lens. In such embodiments also the MEMS light modulator may be positioned at a location in the optical path where it is somewhat out of focus. Technology as described herein may be applied to reflective-type MEMS light modulators as well as to transmissive-type MEMS light modulators.

MEMS technology as described herein may also be used in image capturing devices such as digital cameras, digital video cameras, or the like. As mentioned above, MEMS shutters are capable of switching states very quickly. Some MEMS shutters can switch states more than once in the exposure times commonly used to capture images using CMOS or CCD sensors (e.g., $\frac{1}{500}$s, $\frac{1}{250}$s, $\frac{1}{125}$s, $\frac{1}{60}$s, etc.) Some embodiments take advantage of this to control the amount of light that reaches an image sensor during an image capture exposure.

Figure 7:
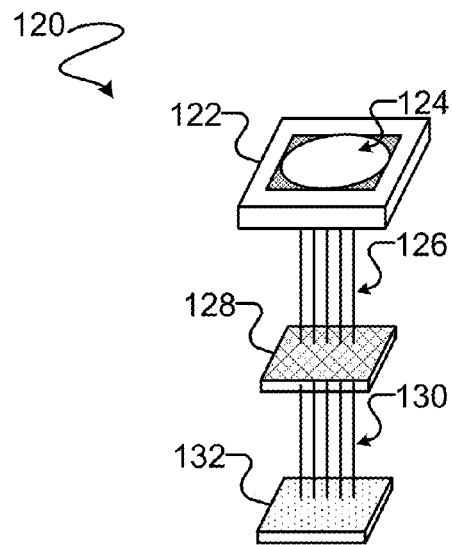
FIG. 7 is a schematic diagram of an image capture apparatus according to an example embodiment.

FIG. 7 is a schematic diagram of an image capture apparatus 120 according to an example embodiment. Image capture apparatus 120 comprises a shutter 122 operable to selectively open and close an aperture 124. Light 126 passing into camera through shutter 122 is incident on MEMS modulator 128. MEMS modulator 128 is operable to selectively block and pass incident light 126. When MEMS modulator 128 is open, it passes incident light 126 with very high efficiency. Incident light 126 not blocked by MEMS modulator 128 passes as light 130 to an image sensor 132. Image sensor 132 may comprise a CMOS or CCD sensor, for example.

In the illustrated embodiment, MEMS modulator 128 is shown spaced apart from image sensor 132. In some embodiments, MEMS modulator 128 and image sensor 132 are in close enough proximity that each pixel of image sensor 132 receives light from only one pixel of MEMS modulator 128 (e.g., pixels of image sensor 132 and MEMS modulator 128 may have a one-to-one relationship or a many-to-one relationship). In other embodiments, pixels of image sensor 132 receive light from more than one pixel of MEMS modulator 128.

A problem with some image sensors is that their pixels may be saturated when they are overexposed. In some embodiments, MEMS modulator 128 is operated to block light that would otherwise cause pixels of image sensor 132 to be overexposed. For example, MEMS modulator 128 may block light for a portion of the time that shutter 122 is open to expose of image sensor 132. Pixel values obtained from light sensor 132 may be scaled according to the amount of light blocked by MEMS modulator 128 during the exposure (e.g., by the amount of time that MEMS modulator 128 block light from that pixel). By avoiding saturating pixels of image sensor 132 with MEMS modulator 128, image capture apparatus 120 may capture higher dynamic range images by increasing the gain of image sensor 132, using longer exposures, using wider exposures, etc.

Figure 8:
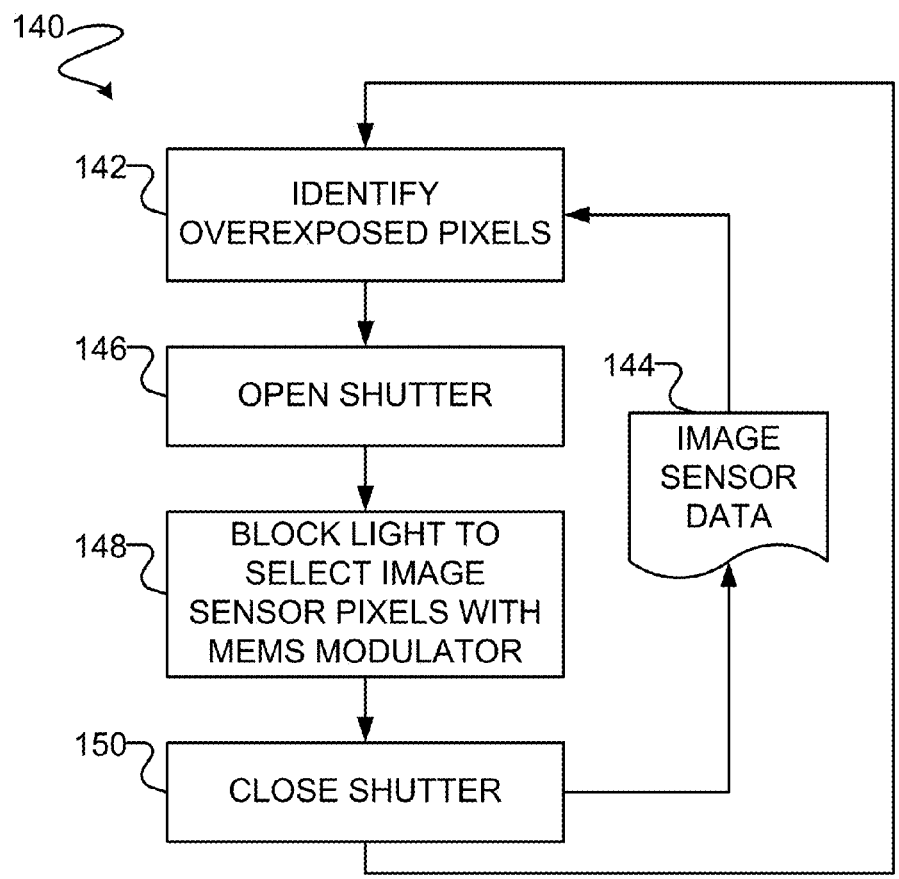
FIG. 8 is a flowchart of a method according to an example embodiment.

FIG. 8 is a flow chart of a method 140 for preventing overexposure of pixels according to an example embodiment. Method 140 may be applied in capturing still images or digital video images. In block 142, overexposed pixels are identified in image sensor data 144. Identifying overexposed pixels in image sensor data 144 may comprise identifying pixels whose values are at the top end of their range. For example, where image sensor data 144 comprises pixels having 8-bit subpixels, block 142 may comprise identifying pixels that have at least one subpixel whose value is equal to 255 or whose value exceeds a threshold such as 252 or 253 or 254 or the like. Pixels having values equal to or exceeding a threshold value (which may be but is not limited to being the maximum value of a range) may be identified as overexposed pixels in block 142.

In some embodiments, block 142 comprises taking a separate exposure. Where a still or video image is being acquired, block 142 may comprise taking a preliminary exposure just before taking a main exposure. The preliminary exposure may be very short. In some embodiments, the image data acquired for the preliminary exposure will be discarded. The preliminary exposure may be used to determine locations of over-exposed areas within an image. In some embodiments the preliminary exposure may be acquired using a separate low-resolution sensor that can be read-out relatively more quickly than a sensor used to obtain a main image. The preliminary exposure may be underexposed. Where a video image is being acquired, block 142 may comprise analyzing image data for a previous frame of the video.

In some embodiments, block 142 yields a configurable watermark identifying locations of pixels that are overexposed (or pixels having exposure levels exceeding some threshold). Such a watermark may optionally be applied to compensate for noise in the sensor.

In block 146, a shutter is opened to expose an image sensor for capturing a new image. In block 148, a MEMS modulator is operated to block light incident on the overexposed pixels identified in block 142. The pixels of the MEMS modulator used to block light in step 148 may be open or closed when the shutter is opened in block 146. Block 148 may comprise closing a pixel of the MEMS modulator open when the shutter was opened in block 146 to block light from reaching an overexposed pixel identified in block 142. Block 148 may comprise opening a pixel of the MEMS modulator that was closed when the shutter was opened in block 146 to allow light to reach an overexposed pixel identified in block 142. In some embodiments, pixels of the MEMS modulator are both opened and closed in block 148. In some embodiments, block 148 comprises rapidly opening and closing some of the MEMS shutters with a duty cycle selected to block a desired proportion of the incident light. Each such MEMS shutter may be opened and shut multiple times during a single exposure.

The length of time that the MEMS modulator does not block light from reaching overexposed pixels identified in step 142 may be the same for all overexposed pixels or different. In some embodiments, the length of time that the MEMS modulator does not block light from reaching an overexposed pixel depends on an estimated or inferred degree of overexposure of the pixel. The degree of overexposure of a pixel may be estimated or inferred based on the values of neighboring pixels, the distance between the overexposed pixel and the nearest non-overexposed pixel, the distance between the overexposed pixel and the nearest non-overexposed pixel having the same or similar values in non-saturated sub-pixels, the gradient of values of non-saturated sub-pixels of non-overexposed pixels near the overexposed pixel, or the like.

In block 150, the shutter is closed to end the exposure, and pixel values of the image sensor are read to supply new image sensor data 144. After block 150, method 140 returns to step 142. In this manner, method 140 iteratively adjusts the amount of light blocked by the MEMS modulator in step 148. In some embodiments, method 140 comprises reducing the amount of light blocked by the MEMS modulator in step 148 (e.g., by decreasing proportion of the time between steps 146 and 150 that the MEMS modulator blocks light from pixels). For example, the length of time that the MEMS modulator blocks light from reaching a pixel previously identified as overexposed may be incrementally decreased until a value of the pixel meets or exceeds a threshold value.

In some embodiments, an enhanced dynamic range image may be obtained by scaling pixel values of image sensor data 144 based on the amount of light blocked by the MEMS modulator in block 148 that would otherwise have reached the corresponding pixels. For example, pixels values of sensor image data 144 may be scaled based on the proportion of the time between steps 146 and 150 that the MEMS modulator blocked light from reaching that pixel.

Figure 9:
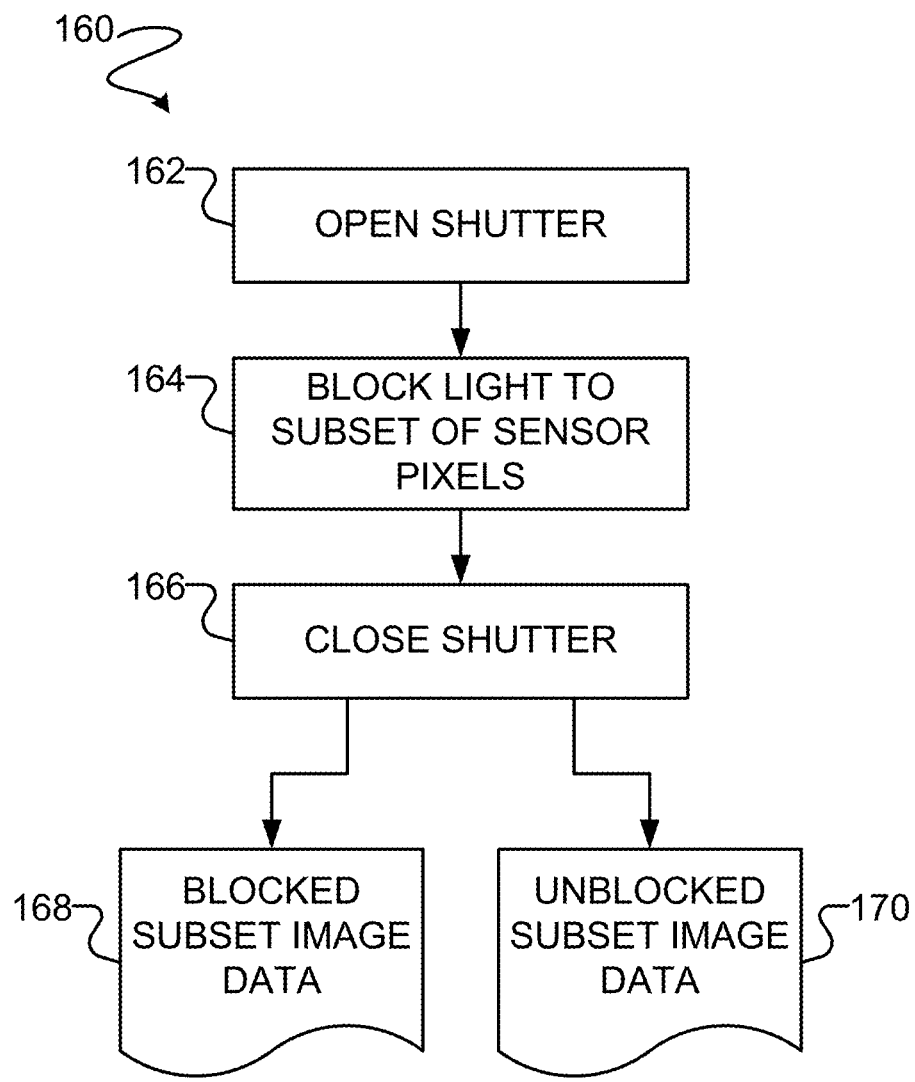
FIG. 9 is a flowchart of a method according to an example embodiment.

In some embodiments, a MEMS light modulator is used in capturing a plurality of images having different but overlapping exposures using the same image sensor. FIG. 9 is a flowchart of a method 160 for using a MEMs light modulator to capture a plurality of images having different but overlapping exposures using the same image sensor. In block 162, a shutter is opened to expose an image sensor for capturing a plurality of images.

In block 164, a MEMS modulator is operated to block light incident on a subset of the pixels of the image sensor exposed in block 162. The subset of pixels blocked in block 164 may comprise pixels uniformly distributed across the image sensor (e.g., a checkerboard pattern of pixels, etc.). The pixels of the MEMS modulator used to block light in step 164 may be open or closed when the shutter is opened in block 162. Block 164 may comprise closing a pixel of the MEMS modulator open when the shutter was opened in block 162 to block light from reaching the subset of image sensor pixels. Block 164 may comprise opening a pixel of the MEMS modulator closed when the shutter was opened in block 162 to allow light to reach the subset of image sensor pixels. In some embodiments, pixels of the MEMS modulator are both opened and closed in block 164.

In block 166, the shutter is closed to end the exposure, and pixel values of the image sensor are read to supply blocked subset image data 168, which corresponds to the subset of pixels blocked by the MEMS modulator in step 166, and unblocked subset image data 170, which corresponds to the subset of pixels not blocked by the MEMS modulator in step 166. Pixels in blocked subset image data 168 will be less exposed than pixels in unblocked subset image data 170. Block subset image data 168 and unblocked subset image data 170 may be combined to produce a high dynamic range image.

It will be appreciated that method 160 may be modified to produce sets of image data corresponding to more than two different exposures. Subsets of pixels corresponding to different exposures need not be the same size. In some embodiments, block 164 of method 160 comprises blocking all of the pixels of the image sensor at one time or another, such as avoid overexposing pixels (e.g., according to method 140).

In some embodiments a MEMS light modulator spaced apart from an image sensor is used to provide different sized apertures. A MEMS modulator may be controlled to define a first aperture by opening a first subset of its pixels defining a first circular area having a first diameter while the remainder of pixels of the MEMS modulator (the first subset complement) are closed, and to define a different second aperture by opening a second subset of its pixels defining a second circular area having a second diameter different from the first diameter while the remainder of pixels of the MEMS modulator (the second subset complement) are closed.

Methods described herein may be implemented in systems comprising hardware, software, firmware or any combination thereof. For example, any of methods 50, 80, 90, 140, and 160 be implemented in part on a programmed computer system coupled or coupleable to one or more of a light sensor (such as an image sensor, for example), a MEMs modulator and a shutter. Such a programmed computer system may comprise one or more processors, user input apparatus, displays and the like. Processors may comprise microprocessors, digital signal processors, graphics processors, field programmable gate arrays, and/or the like.

Where a component (e.g. MEMS light modulator, light sensor, modulator driver, image processor, calibration processor, light source driver, light guide, image sensor, shutter, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Aspects of the invention may be provided in the form of a program product. The program product may comprise any non-transitory medium which carries a set of computer-readable information comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable information on the program product may optionally be compressed or encrypted.

Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

While a number of exemplary aspects and embodiments have been discussed above, those of skill in the art will recognize certain modifications, permutations, additions and sub-combinations thereof.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A display comprising:
   a MEMS light modulator comprising a plurality of pixels switchable between ON and OFF states;
   a light source configured to illuminate the MEMS light modulator;
   and
   a light sensor configured to be illuminated primarily by light from the light source reflected by one or more pixels of the MEMS light modulator when the one or more pixels of the MEMS modulator are in the OFF state, and wherein the light sensor is configured to be illuminated primarily by ambient light reaching the light sensor by way of the one or more pixels of the MEMS modulator when the one or more pixels are in the ON state;
   wherein the MEMS light modulator is configured to image light away from the light sensor.

2. The display of claim 1 comprising a second light modulator configured to modulate light transmitted by the MEMS light modulator.

3. A display according to claim 1 wherein the light source comprises an array of spaced-apart light emitters and the light sensor is arranged generally co-planar with the light emitters between the light emitters.

4. A display according to claim 3 wherein the light sensor is one of a plurality of light sensors arranged generally co-planar with and between the light emitters.

5. A display according to claim 4 wherein the light emitters of the light source are individually-controllable according to image data.

6. A display according to claim 1 comprising a calibration processor connected to receive a signal output of the light sensor and to process the signal output to yield calibration data.

7. A display according to claim 6 wherein the calibration processor is connected to supply the calibration data to an image processor connected to receive and process image data and to control a MEMS module driver connected to drive the MEMS light modulator.

8. A display according to claim 7 wherein the image processor is connected to control a light source driver and the calibration processor is connected to supply the calibration data to the MEMS module driver and the light source driver.

9. A display according to claim 7 wherein the light source comprises a plurality of individually-controllable light source elements and the calibration processor is configured to acquire data from the light sensor during a calibration routine comprising:
   switching the one or more of the pixels of the MEMS light modulator to the OFF state;
   operating one or more of the individual light source elements of the light source; and
   measuring light received at the light sensor.

10. A display according to claim 9 wherein the calibration processor is configured to perform the calibration routine between display of frames of a video.

11. A display according to claim 10 wherein the calibration routine is performed for one individual one of the light source elements in an inter-frame interval.

12. A display according to claim 10 wherein the calibration processor is configured to switch all pixels of the MEMS light modulator to the OFF state in an inter-frame interval.

13. A display according to claim 1 wherein the light source comprises a plurality of individually-controllable light emitters, the light sensor is one of a plurality of light sensors and the display is configured to:
   control the light emitters to be illuminated to display an image;
   switch the pixels of the MEMS light modulator to the OFF state while the light emitters are illuminated to display the image; and
   detect light intensities at the plurality of light sensors, thereby detecting a spatial variation in the pattern of light produced by the light emitters.

14. A display according to claim 1 wherein the display is configured to adjust one or more of image contrast, image brightness and color saturation based on the ambient light detected by the light sensor.

15. A display according to claim 1 wherein pixels of the MEMS light modulator are controlled to switch between the ON and OFF states according to an operating cycle and the display is configured to obtain the output of the light sensor according to a phase of the operating cycle for the pixels of the MEMS light modulator such that the output of the light sensor is obtained at a phase of the operating cycle when the pixels of the MEMS light modulator are in the ON state.

16. A display according to claim 15 wherein the display is configured to obtain the output of the light sensor when the light source is not emitting light.

17. A display according to claim 1 wherein the light source comprises a plurality of individually-controllable light source elements controlled according to image data.

18. A display according to claim 1 wherein the light sensor is recessed in a recess, pit or channel behind the MEMS light modulator.

19. A display according to claim 1 wherein the light sensor is one of a plurality of light sensors and one or more of the plurality of light sensors comprises a wide passband filter with stop bands matched to emission wavebands of the light source.

20. A display according to claim 1 wherein the MEMS light modulator is illuminated by light from a waveguide configured to receive light from the light source.

21. A display according to claim 20 wherein the light source comprises a plurality of light emitters arranged to emit light into the waveguide and the light sensor is located between two of the plurality of light emitters.

22. A display according to claim 1 wherein the light sensor is one of a plurality of light sensors arranged to detect variations in back-reflected light over the area of the MEMS light modulator and to register a low-resolution image cast by the back-reflected light.

23. A display according to claim 22 wherein the display is configured to interpolate estimated luminance values at one or more points between adjacent points corresponding to the light sensors.

24. A display according to claim 1 comprising a calibration processor configured to process signals from the light sensors to yield spatially-specific calibration data and one or more of an image processor, light source driver and MEMS module driver configured to apply the spatially-specific calibration data to make adjustments that affect the spatial variation of light passed to a screen by the MEMS light modulator.

25. A display according to claim 4 wherein each of the plurality of light emitters is configured to illuminate a corresponding one of the plurality of MEMS pixels, and the illuminated MEMS pixel reflects the emitted light onto a corresponding one of the plurality of light sensors.

26. A display according to claim 25 wherein each of the plurality of light sensors is configured to detect ambient light admitted by the corresponding one of the plurality of MEMS pixels.

27. A display according to claim 1 wherein the light sensor is one of a plurality of light sensors;
wherein each light sensor corresponds to one of the plurality of pixels of the MEMS light modulator; and
wherein the display is configured to measure the ambient light level simultaneously with displaying an image by:
switching one or more of the pixels of the MEMS light modulator to the ON state; and
measuring the ambient light level at one or more of those of the light sensors corresponding to the one or more pixels in the ON state.

28. A display according to claim 27 wherein the light source comprises a plurality of individually controllable light emitters;
wherein each of the plurality of light emitters corresponds to one of the pixels of the MEMS light modulator; and
wherein the display is configured to deactivate those of the plurality of light emitters corresponding to those of the pixels of the MEMS light modulator in the ON state while measuring the ambient light level.

29. A method for calibrating a display comprising a MEMS light modulator and a light source, the method comprising:
closing at least one shutter of the MEMS light modulator;
illuminating the at least one shutter with light from the light source;
detecting at a light sensor primarily light from the light source reflected by the at least one shutter; and
measuring an ambient light level by opening the at least one shutter of the MEMS light modulator and detecting at the light sensor primarily the ambient light that has reached the light sensor by way of the at least one open shutter of the MEMS light modulator.

30. The method of claim 29 comprising controlling the light source based at least in part on the detected light.

31. The method of claim 29 comprising controlling transmission of light by the MEMS light modulator based at least in part on the detected light.

32. The method of claim 29 wherein the display comprises a second light modulator configured to modulate light transmitted by the MEMS light modulator, the method comprising controlling the second light modulator based at least in part on the detected light.

33. The method of claim 29 wherein the light source is a spatially-variable light source, the method comprises controlling the light source to provide a spatially-varying pattern of light in the form of a low-resolution version of an image to be displayed and wherein detecting light reflected by the at least one shutter comprises detecting the spatially-varying pattern of light.

34. The method of claim 33 comprising estimating a light field produced by the spatially-variable light source based on the detected spatially-varying pattern of light.

35. The method of claim 33 comprising refining an estimated light field based on the detected spatially-varying pattern of light.

36. The method of claim 34 wherein the estimated light field is at the MEMS light modulator.

37. The method of claim 29 wherein the light source comprises a plurality of individually-controllable light sources, the light sensor is one of a plurality of light sensors, each of the plurality of light sources is configured to primarily illuminate one of the plurality of MEMS shutters, and each of the MEMS shutters is configured to reflect light primarily onto one of the plurality of light sensors.

38. The method of claim 37 wherein each of the plurality of light sensors is configured to detect primarily ambient light admitted by a corresponding one of the plurality of MEMS shutters when the corresponding one of the plurality of MEMS shutters is open.

39. The method of claim 29 wherein the light sensor is one of a plurality of light sensors and the method comprises measuring the ambient light level at the same time as displaying an image by:
opening one or more of the shutters of the MEMS light modulator; and
measuring the ambient light level at one or more of the light sensors that is primarily illuminated by ambient light that has reached the light sensor by way of the one or more open shutters of the MEMS light modulator.

40. The method of claim 39 wherein the light source comprises a plurality of light emitters, and measuring the ambient light level at the same time as displaying an image comprises:
selectively deactivating one or more of the plurality of light emitters corresponding to the one or more of the light sensors that is primarily illuminated by ambient light that has reached the light sensor by way of the one or more open shutters of the MEMS light modulator.

41. A display comprising:
a MEMS light modulator comprising a plurality of pixels switchable between ON and OFF states;
a light source configured to illuminate the MEMS light modulator;
and a light sensor configured to be illuminated primarily by light from the light source reflected by one or more pixels of the MEMS light modulator when the one or more pixels of the MEMS modulator are in the OFF state, and wherein the light sensor is configured to be illuminated primarily by ambient light reaching the light sensor by way of the one or more pixels of the MEMS modulator when the one or more pixels are in the ON state;

wherein the MEMS light modulator is configured to image light away from the light sensor;

wherein the light source comprises an array of spaced-apart light emitters and the light sensor is arranged generally co-planar with the light emitters between the light emitters;

wherein the light sensor is one of a plurality of light sensors arranged generally co-planar with and between the light emitters;

wherein each of the plurality of light emitters is configured to illuminate a corresponding one of the plurality of MEMS pixels, and the illuminated MEMS pixel reflects the emitted light onto a corresponding one of the plurality of light sensors;

wherein each of the plurality of light sensors is configured to detect ambient light admitted by the corresponding one of the plurality of MEMS pixels;

wherein the light emitters and MEMS pixels are individually controllable, and the ambient light level is measured simultaneously with displaying an image by:
  selectively deactivating light emitters of the plurality of light emitters corresponding to the one or more MEMS pixels and switching the one or more MEMS pixels to the ON state; and
  measuring the ambient light level at the light sensors corresponding to the one or more MEMS pixels and deactivated light emitters.

42. A method for calibrating a display comprising a MEMS light modulator and a light source, the method comprising:
  closing at least one shutter of the MEMS light modulator;
  illuminating the at least one shutter with light from the light source;
  detecting at a light sensor primarily light from the light source reflected by the at least one shutter; and
  measuring an ambient light level by opening the at least one shutter of the MEMS light modulator and detecting at the light sensor primarily the ambient light that has reached the light sensor by way of the at least one open shutter of the MEMS light modulator;

wherein the light source comprises a plurality of individually-controllable light sources, the light sensor is one of a plurality of light sensors, each of the plurality of light sources is configured to primarily illuminate one of the plurality of MEMS shutters, and each of the MEMS shutters is configured to reflect light primarily onto one of the plurality of light sensors;

wherein each of the plurality of light sensors is configured to detect primarily ambient light admitted by a corresponding one of the plurality of MEMS shutters when the corresponding one of the plurality of MEMS shutters is open;

wherein the method comprises measuring the ambient light level at the same time as displaying an image by:
  selectively deactivating some of the plurality of light emitters;
  opening the MEMS shutters corresponding to the deactivated light emitters; and
  measuring the ambient light level at the light sensors corresponding to the open MEMS shutters and deactivated light emitters.

* * * * *